(12) United States Patent
Gann

(10) Patent No.: US 6,324,311 B1
(45) Date of Patent: Nov. 27, 2001

(54) METHOD AND APPARATUS FOR INTEGRATING AN IMAGE CAPTURE DEVICE WITH A LIGHT SOURCE

(75) Inventor: Robert G. Gann, Bellvue, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/126,464

(22) Filed: Jul. 30, 1998

(51) Int. Cl.[7] ...................................................... G06K 7/00
(52) U.S. Cl. ............................ 382/312; 396/213; 358/478
(58) Field of Search ........................... 382/312; 396/213; 358/478; 348/211

(56) References Cited

U.S. PATENT DOCUMENTS

| | | | |
|---|---|---|---|
| 3,585,914 | * 6/1971 | Oki | 95/11.5 R |
| 3,696,720 | * 10/1972 | Vinson | 396/213 |
| 3,739,118 | * 6/1973 | Bounds | 200/61.45 R |
| 3,759,153 | * 9/1973 | Aimo et al. | 95/11 R |
| 3,812,500 | * 5/1974 | Ernisse et al. | 354/32 |
| 3,967,302 | * 6/1976 | Cote et al. | 354/295 |
| 5,663,758 | * 9/1997 | Linville | 348/85 |
| 5,790,276 | * 8/1998 | Stephenson, III | 358/487 |
| 6,067,112 | 5/2000 | Wellner et al. | 348/211 |

FOREIGN PATENT DOCUMENTS

| | | | |
|---|---|---|---|
| 0749034 | 12/1996 | (EP) | G03B/17/56 |
| 0838751 | * 4/1998 | (EP) | G06F/3/033 |
| 2 740 245 | 4/1997 | (FR) | G08B/13/196 |

OTHER PUBLICATIONS

European Search Report, Application No. EP 99 30 5696, 1 page.

* cited by examiner

*Primary Examiner*—Jose L. Couso
*Assistant Examiner*—Anh Hong Do

(57) ABSTRACT

An integrated image capture device and a desk and floor lamp. The image capture device is adapted to plug or screw into the light bulb socket of the lamp so that the image capture device may obtain power from the light bulb socket of the lamp when the lamp is plugged into a wall socket. The image capture device may also have a 'pass-through' socket adapted to receive a standard light bulb so that the standard light bulb may provide additional light for the image capture device. The image capture device may also provide modulation to the light bulb in order to perform exposure control. The image capture device may also provide color compensation by measuring the intensity and color of the light from the light bulb. The image capture device may also perform data transmission through the power cord of the desk or floor lamp.

15 Claims, 1 Drawing Sheet

METHOD AND APPARATUS FOR INTEGRATING AN IMAGE CAPTURE DEVICE WITH A LIGHT SOURCE

FIELD OF THE INVENTION

The present invention relates generally to the field of image capture devices and more particularly to a method and apparatus for integrating an image capture device to a light source. In particular, this invention provides for the integration of a video camera, digital camera or CCD camera with an office, desk or floor lamp.

BACKGROUND OF THE INVENTION

Image capture devices such as digital cameras, video cameras and CCD cameras are sometimes used with computers for video conferencing, still image capture and other potential image capture tasks. Digital cameras, video cameras and CCD cameras require some power supply source and some light source. Generally, the power supply is either a wall socket or a battery on the camera. However, camera batteries typically have a very short life between recharges. Also, most offices and conference rooms tend to run short on spare sockets due to the many computers, printers, scanners, CRT's, TV's, lights, fans, heaters, etc. that are typically plugged in in any given office or conference room. Accordingly, there is a desire to have a means for a reliable power supply for a camera or other such image capture device.

Typically, the light source used by most cameras and image capture devices is ambient light, however, it would be desirable to have an auxiliary light source. It would be handy and convenient to have a light source that was integrated with the camera.

SUMMARY OF THE INVENTION

The above and other aspects of the present invention are accomplished in an image capture device that is integrated into a typical desk or floor lamp, wherein the image capture device screws into the light bulb socket, obtaining its power from the lamp socket. The image capture device would then provide a 'pass-through' socket in which a standard light bulb could be installed. The image capture device could then obtain its power from the light bulb socket, provide 'pass-through' socket for a standard light bulb and use the light from the light bulb as an auxiliary light source during the image capture process. The image capture device may also include a sensor that images the light source and provides color compensation for the light source prior to performing an image capture. Moreover, the lamp could be modulated for exposure control purposes. Also, data transfer may be accomplished via modulation of the power supply cord to the lamp.

BRIEF DESCRIPTION OF THE DRAWINGS

The above and other objects, features and advantages of the present invention will be better understood by reading the following more particular description of the invention, presented in conjunction with the following drawing, wherein.

DETAILED DESCRIPTION OF THE PREFERRED EMBODIMENT

Figure 1B:
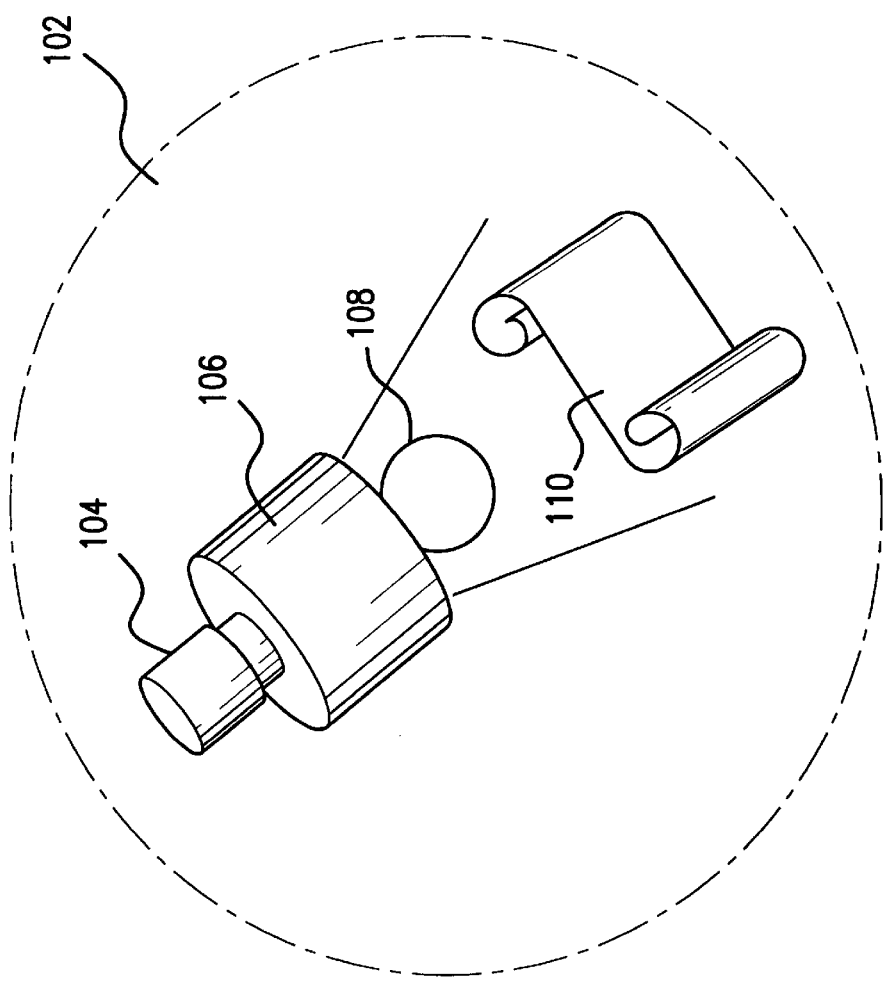
FIG. 1B is a detail view of the area identified by the reference numeral 102 in FIG. 1.
Figure 1A:
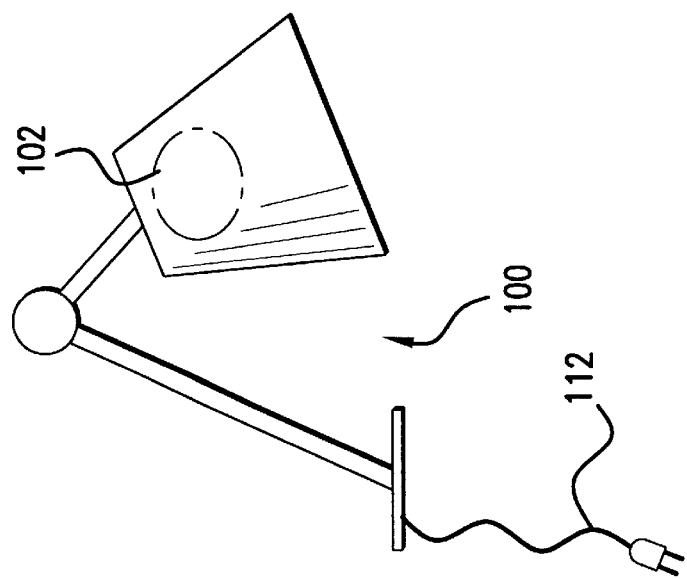
FIG. 1A illustrates an integrated image capture device and lamp according to the present invention.

FIGS. 1A and 1B illustrate a desk, office or floor lamp 100 with an exploded image 102 showing the present invention.

FIG. 1B shows a socket 104 for the lamp 100. An image capture device 106 is screwed into the lamp socket 104 such that the image capture device 106 may obtain power from the power cord of the lamp 100 via the socket 104. The image capture device 106 provides a 'pass-through' socket, not shown, which permits a standard light bulb 108 to be screwed into the image capture device 106 and obtain power from the 'pass-through' socket.

In operation, when power is supplied to the lamp 100 by means of plugging in the power cord and/or turning on a switch, power is supplied to the image capture device 106. The image capture device 106 may be a digital camera, video camera, CCD camera or the like. The image capture device 106 may also have an on/off switch (not shown) and may also provide an on/off switch (not shown) to the 'pass-through' socket, thus permitting either the image capture device 106 or the light bulb 108 to be used separately.

If it is determined that the ambient light is not sufficient to perform image capture, the auxiliary light bulb 108 may be turned on. A preliminary image may be taken and internal or external software on the image capture device 106 may determine whether color compensation or if light modulation is needed for the light source or not. The internal or external software will then initiate any necessary color compensation or exposure control light modulation. Then the image capture process may begin. Data transmission of the image captured may be by any known standard means for the particular image capture device in use or by modulation along the power supply cord 112 for the lamp 102, infrared or other known transmission means.

From the foregoing, it will be appreciated that the image capture device 106 and an auxiliary lamp or light source 108 of the present invention use a shared, existing power cord 112. Another advantage of the present invention is that there is no additional floor or desk space needed for the image capture device 106, as the lamp is already utilizing its footprint. Additionally, there is a dramatic increase in the available light source over ambient light for image capture. Further, the additional light source may be modulated by the image capture device and the 'pass-through' socket for exposure control. As different lamps and light bulbs may be utilized in different settings, the image capture device 106 may measure the light source and provide appropriate color compensation during the image capture process. Alternatively, a special "known" light bulb may be provided with the image capture device 106 to obviate the need for color compensation. The power cord 112 of the lamp 100 may be utilized for data transmission by means of data modulation. It should be noted that lamp 100 may be any generic desk or floor lamp such as the type used in the home or office setting and light bulb 108 is any standard light bulb used in a desk or floor lamp in the home or office setting.

The foregoing description of the present invention has been presented for purposes of illustration and description. It is not intended to be exhaustive or to limit the invention to the precise form disclosed, and other modifications and variations may be possible in light of the above teachings. For example, although the present invention was described for the application to an incandescent lamp, it is readily apparent that the present invention is also applicable to a fluorescent lamp. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A device comprising:

a lamp having a light bulb socket;

an image capture device adapted for obtaining power from said light bulb socket of said lamp; and wherein said image capture device has a pass-through socket adapted to receive a light bulb.

2. The device according to claim 1, wherein said light bulb socket is adapted for receiving an incandescent light bulb.

3. The device according to claim 1, wherein said light bulb socket is adapted for receiving a fluorescent light bulb.

4. The device according to claim 1, wherein said image capture device further comprises a means for color compensation.

5. The device according to claim 1, wherein said image capture device further comprises a means for modulating said pass-through socket for exposure control.

6. The device according to claim 1, wherein said image capture device is a digital camera.

7. The device according to claim 1, wherein said image capture device is a video camera.

8. The device according to claim 1, wherein said image capture device is a CCD camera.

9. A device comprising:

an image capture device adapted for obtaining power from a light socket of a lamp; and a pass-through socket integral with said image capture device, said pass-through socket adapted for receiving a light bulb.

10. The device according to claim 9, wherein said image capture device is a digital camera.

11. The device according to claim 9, wherein said image capture device is a video camera.

12. The device according to claim 9, wherein said image capture device is a CCD camera.

13. A method for capturing an image comprising:

(a) attaching an image capture device to a light socket of a lamp;

(b) supplying power to said lamp;

(c) said image capture device obtaining power from said light socket of said lamp;

(d) performing an image capture process; and (e) said image capture device supplying power to a light bulb by means of a pass-through socket.

14. The method for capturing an image according to claim 13 further comprising:

modulating said light bulb in order to provide exposure control.

15. The method for capturing an image according to claim 13 further comprising:

providing color compensation prior to performing said image capture process.

* * * * *